(12) United States Patent
Alieiev et al.

(10) Patent No.: US 10,432,431 B2
(45) Date of Patent: Oct. 1, 2019

(54) APPARATUSES, METHODS AND COMPUTER PROGRAMS FOR ESTIMATING A MULTI-HOP RADIO CHANNEL BETWEEN A TRANSMITTER, ONE OR MORE RELAY STATIONS, AND A RECEIVER IN A MOBILE COMMUNICATION SYSTEM

(71) Applicant: VOLKSWAGEN AG, Wolfsburg (DE)

(72) Inventors: Roman Alieiev, Stendal (DE); Andreas Kwoczek, Lehre (DE); Thorsten Hehn, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/907,834

(22) Filed: Feb. 28, 2018

(65) Prior Publication Data

US 2018/0262367 A1    Sep. 13, 2018

(30) Foreign Application Priority Data

Mar. 13, 2017    (EP) .................................... 17160535

(51) Int. Cl.
*H04L 25/02* (2006.01)
*H04B 7/26* (2006.01)
(Continued)

(52) U.S. Cl.
CPC ....... *H04L 25/0204* (2013.01); *H04B 7/2606* (2013.01); *H04B 17/309* (2015.01);
(Continued)

(58) Field of Classification Search
CPC combination set(s) only.
See application file for complete search history.

(56) References Cited

U.S. PATENT DOCUMENTS

| 2010/0232436 A1* | 9/2010 | Fujii | H04B 7/2606 370/400 |
| 2012/0195225 A1* | 8/2012 | Salonidis | H04W 24/10 370/252 |
| 2016/0285540 A1 | 9/2016 | Bhargava et al. | |

FOREIGN PATENT DOCUMENTS

EP    3007368 A1    4/2016
JP    2006087038 A    3/2006
(Continued)

OTHER PUBLICATIONS

Alieiev et al.; Sensor-based communication prediction for dynamic Doppler-shift compensation (abstract); Proceedings; International Conference on ITS Telecommunications; IEEE; 2017.
(Continued)

*Primary Examiner* — Hicham B Foud
(74) *Attorney, Agent, or Firm* — Barnes & Thorburg LLP

(57) ABSTRACT

Apparatuses, methods and computer programs for estimating a multi-hop radio channel between a transmitter, one or more relay stations, and a receiver in a mobile communication system. The apparatus includes one or more interfaces to obtain information related to a position and a state of movement of the transmitter and receiver, information related to an environment of the transmitter, the receiver, and the one or more relay stations, information related to channel state feedback of single-hop radio channels between the transmitter, the receiver, and the one or more relay stations, and information related to delays of the channel state feedback. The apparatus also includes a control module to control the one or more.

13 Claims, 4 Drawing Sheets

(51) Int. Cl.
| | |
|---|---|
| *H04W 24/10* | (2009.01) |
| *H04L 1/00* | (2006.01) |
| *H04W 4/02* | (2018.01) |
| *H04W 4/04* | (2009.01) |
| *H04W 40/12* | (2009.01) |
| *H04W 40/20* | (2009.01) |
| *H04B 17/309* | (2015.01) |
| *H04B 17/373* | (2015.01) |
| *H04B 7/026* | (2017.01) |
| *H04W 84/18* | (2009.01) |
| *H04L 1/20* | (2006.01) |
| *H04L 29/08* | (2006.01) |
| *H04W 4/46* | (2018.01) |
| *H04W 4/44* | (2018.01) |

(52) U.S. Cl.
CPC ......... *H04B 17/373* (2015.01); *H04L 1/0026* (2013.01); *H04L 1/0027* (2013.01); *H04L 25/0226* (2013.01); *H04W 4/025* (2013.01); *H04W 4/04* (2013.01); *H04W 24/10* (2013.01); *H04W 40/12* (2013.01); *H04W 40/20* (2013.01); *H04B 7/026* (2013.01); *H04L 1/20* (2013.01); *H04L 67/12* (2013.01); *H04L 2001/0097* (2013.01); *H04W 4/026* (2013.01); *H04W 4/027* (2013.01); *H04W 4/44* (2018.02); *H04W 4/46* (2018.02); *H04W 84/18* (2013.01)

(56) References Cited

FOREIGN PATENT DOCUMENTS

| JP | 2007074304 A | 3/2007 |
|---|---|---|
| JP | 2008042338 A | 2/2008 |

OTHER PUBLICATIONS

Daniels et al.; Link Adaptation with Position/Motion Information in Vehicle-to-Vehicle Networks; IEEE Transactions on Wireless Communications; Feb. 2012; pp. 505-509; vol. 11, No. 2.

Mehta et al.; Enabling Adaptive Rate and Relay Selection for 802.11 Mobile Ad Hoc Networks; IEEE Wireless Communications Symposium; Jun. 10, 2012; pp. 4150-4154.

Search Report for European Patent Application No. 17160535.5; dated Sep. 22, 2017.

\* cited by examiner

APPARATUSES, METHODS AND COMPUTER PROGRAMS FOR ESTIMATING A MULTI-HOP RADIO CHANNEL BETWEEN A TRANSMITTER, ONE OR MORE RELAY STATIONS, AND A RECEIVER IN A MOBILE COMMUNICATION SYSTEM

PRIORITY CLAIM

This patent application claims priority to European Patent Application No. 17160535.5, filed 13 Mar. 2017, the disclosure of which is incorporated herein by reference in its entirety.

SUMMARY

Illustrative embodiments relate to apparatuses, methods and computer programs for estimating a multi-hop radio channel between a transmitter, one or more relay stations, and a receiver in a mobile communication system, more particularly, but not exclusively, to a concept for multi-hop channel estimation in an inter vehicular multi-hop communication scenario under the presence of delayed Channel State Information (CSI) feedback.

BRIEF DESCRIPTION OF THE DRAWINGS

Disclosed embodiments will be described with reference to the accompanying figures, in which.

DETAILED DESCRIPTION

Figure 1:
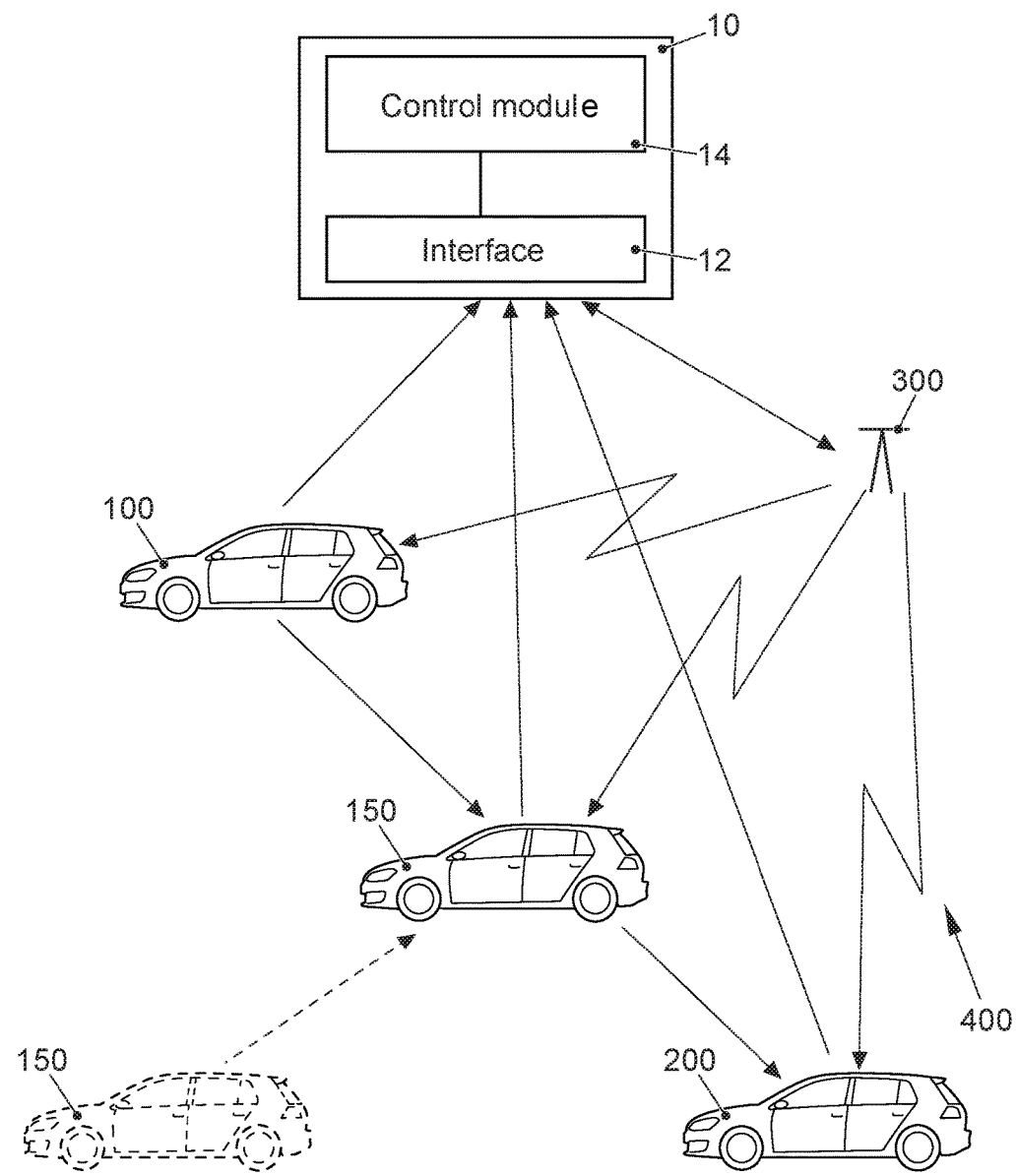
FIG. 1 illustrates an embodiment of an apparatus for estimating a multi-hop radio channel between a transmitter, one or more relay stations, and a receiver in a mobile communication system.

Direct communication between portable devices and transportation vehicles is a feature of some mobile communication systems. Future cars may include communications systems which allow for direct data transmission between the transportation vehicles. One very prominent example is direct transmission according to the IEEE (Institute of Electrical and Electronics Engineers) 802.11p standard (and the corresponding upper layer standards). A common use for such a vehicular connectivity standard is to broadcast information to neighboring transportation vehicles. This can be status information, which would be transmitted regularly or event-driven messages such as emergency information. An alternative to IEEE 802.11p is under standardization by the industry consortium 3GPP (Third Generation Partnership Project). This consortium develops cellular communications technology and proposes a direct communication standard for transportation vehicles, called C-V2X (Cellular Vehicle to Everything). This concept has efficient methods for transmitting status information in a regular pattern.

Channel estimation and optimal end-to-end path selection in dynamic multi-hop networks can be a very challenging problem. Potentially, a large number of possible dynamic links and hops are monitored by a decision making node, which results in an increased mismatch between the estimated and actual Channel State Information (CSI) at the transmission time. The increase of CSI mismatch is known as CSI aging.

Minimization of CSI aging is a recognized problem in literature. Some approaches collect multiple past channel estimates to predict future channel conditions and at least some of them are application- or scenario-limited. For example, the performance of spline interpolation and averaging highly depends on the dynamics of the environment, while historical averaging may completely fail in dynamic environments.

There is a demand for an improved concept for channel estimation of a multi-hop radio channel in a mobile communication system. The disclosed embodiments provide an improved concept for channel estimation of a multi-hop radio channel in a mobile communication system.

Disclosed embodiments are based on the finding that technological achievements of modern transportation vehicles lead by developments in automated driving solutions can be beneficially used to improve communication between two transportation vehicles due to a better understanding of the nature of communication link properties. Such benefits of direct Vehicle-to-Vehicle (V2V) communication can be achieved using sensor-aided vehicular predictive communications. Disclosed embodiments may address application of sensor-based vehicular prediction algorithms for multi-hop link quality forecasting and an end-to-end path selection in highly dynamic vehicular networks. Disclosed embodiments may use an extended concept of sensor-aided predictive communications applied to multi-hop V2V scenarios. This may allow providing more reliable multi-hop link-quality estimation and path-selection.

Disclosed embodiments provide an apparatus for estimating a multi-hop radio channel between a transmitter, one or more relay stations, and a receiver in a mobile communication system. The apparatus comprises one or more interfaces to obtain information. The information obtained comprises information related to a position and a state of movement of the transmitter and receiver, information related to an environment of the transmitter, the receiver, and the one or more relay stations, information related to channel state feedback of single-hop radio channels between the transmitter, the receiver, and the one or more relay stations, and information related to delays of the channel state feedback.

The apparatus further comprises a control module configured to control the interface. The control module is further configured to determine information related to a channel state and a configuration of the multi-hop radio channel based on the information obtained via the one or more interfaces. The information comprises the information related to the position and the state of movement of the transmitter and receiver, the information related to the environment of the transmitter, the receiver, and the one or more relay stations, the information related to the channel state feedback of the single-hop radio channels between the transmitter, the one or more relay stations, and the transmitter, and the information related to delay of the channel state feedback. Disclosed embodiments may provide improved channel estimation for multi-hop radio channels, in particular, in vehicular communication scenarios.

In some disclosed embodiments the control module is configured to determine the information related to the configuration of the multi-hop radio channel by evaluating different combinations of the single-hop radio channels based on a weakest link per combination. An example or such evaluation can be found in R. Alieiev, T. Hehn, A. Kwoczek, and T. Kilmer, "Sensor-based communication prediction for dynamic Doppler-shift compensation," in Proceedings, International Conference on ITS Telecommunications. IEEE, 2017, which is incorporated herein in its entirety and in relation to single-hob radio channel characteristics, more particularly, but not exclusively, in relation to channel estimation and prediction based on environmental information.

Disclosed embodiments may provide an efficient determination of a multi-hop link configuration. In further disclosed embodiments the control module may be configured to determine the information related to the channel state of the multi-hop radio channel by selecting the weakest single-hop radio channel of the multi-hop radio channel to be above a threshold. Disclosed embodiments may determine a multi-hop link configuration based on evaluating the weakest link of a configuration and selecting based on a best weakest link or at least by assuring that a weakest link quality lies above a threshold.

The control module may be further configured to determine the information related to the channel state and the configuration of the multi-hop radio channel by selecting a combination of single-hop radio channels with a highest spectral efficiency of the weakest link comprised in the combination as configuration for the multi-hop radio channel. Hence, a spectral efficiency of the weakest link may be optimized or improved at least in some disclosed embodiments to achieve a desired quality of the multi-hop radio channel. The control module may be configured to predict a future channel state of the single-hop channels based on the information related to the position and state of movement of the transmitter and the receiver and based on the information related to the environment of the transmitter, the receiver, and the one or more relay stations. The control module may use statistical information related to the environment (location, position, direction, historical data, etc.) to predict or estimate a radio channel. The control module can be configured to predict a future channel state of the multi-hop radio channel based on the information related to the position and state of movement of the transmitter and the receiver and based on the information related to the environment of the transmitter the receiver and the one or more relay stations.

In some disclosed embodiments the control module may be configured to provide information related to an adapted reporting rate for a single-hop channel. The information related to the adapted reporting rate may be based on a predicted coherence time of the single-hop channel. Disclosed embodiments may adapt the reporting rate or single-hop radio channel feedback based on a coherence time of a radio channel. At least one of the transmitter, the receiver, and the one or more relay stations may correspond to a vehicular entity. The control module may be configured to provide the information related to the configuration of the multi-hop radio channel to the at least one vehicular entity. Disclosed embodiments may determine and control configurations of multi-hop channels in vehicular communication.

The information related to the environment of the transmitter, the receiver, and the one or more relay stations may, at least in some disclosed embodiments, comprise information related to estimated positions and dimensions of objects detected in the environment. Disclosed embodiments may consider objects influencing the radio channel, information on which may be detected by vehicular sensor as part of environmental detectors. The information related to channel state feedback of the single-hop radio channels between the transmitter, the receiver, and the one or more relay stations may comprise information related to confidence intervals of the feedback information. Information on confidence intervals may be further used to determine reporting rate for the individual single-hop radio channel to achieve a desired confidence.

In further disclosed embodiments the control module may be configured to compare a predicted channel quality with an actual channel quality of the multi-hop radio channel and to adjust a feedback reporting rate for the information related to a single-hop radio the channel based on a deviation between the predicted and the actual channel quality. Disclosed embodiments may allow adaptation of a feedback reporting rate based on channel estimation inaccuracies determined by deviation between estimated and actual channel qualities.

Disclosed embodiments also provide a method for estimating a multi-hop radio channel between a transmitter, one or more relay stations, and a receiver in a mobile communication system. The method comprises obtaining information related to a position and a state of movement of the transmitter and receiver, information related to an environment of the transmitter, the receiver, and the one or more relay stations, information related to channel state feedback of single-hop radio channels between the transmitter, the receiver, and the one or more relay stations, and information related to delays of the channel state feedback. The method further comprises determining information related to a channel state and a configuration of the multi-hop radio channel based on the information related to the position and the state of movement of the transmitter and receiver, the information related to the environment of the transmitter, the receiver, and the one or more relay stations, the information related to the channel state feedback of the single-hop radio channels between the transmitter, the one or more relay stations, and the transmitter, and the information related to delay of the channel state feedback.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates an embodiment of an apparatus 10 for estimating a multi-hop radio channel between a transmitter 100, one or more relay stations 150, and a receiver 200 in a mobile communication system 400. In disclosed embodiments, the apparatus 10 may be comprised in a network node, such as a base station 300, a network controller, or any other entity. Disclosed embodiments also provide a base station transceiver 300 or other network node comprising an embodiment of the apparatus 10. The transmitter 100, the one or more relay stations 150 and the receiver 200 may also correspond to network nodes such as mobile transceivers. Communication links (radio channels) are indicated using arrows in FIG. 1.

As shown in FIG. 1 a mobile transceiver or relay station can be comprised in a transportation vehicle, such that inter-vehicular communication is a scenario in which disclosed embodiments may be applied. For example, the transmitter 100, the one or more relay stations 150 and the receiver 200 may all be transportation vehicles potentially communicating with the base station transceiver 300 and directly with each other. Directly in this context means that the communication link (for data) does not involve the base station transceiver but may use multi-hop communication from one transportation vehicle to another, which further forwards the data to yet another transportation vehicle as shown in FIG. 1, data transmission from transmitter 100 to receiver 200 via relay station 150. In a scenario as shown in FIG. 1, some more transportation vehicles may be too far from the eNB to establish a direct link to the eNB, i.e., there may be out-of-coverage, in-coverage and mixed scenarios. Disclosed embodiments may apply to all of these scenarios. Accordingly, in a scenario as exemplified in FIG. 1, there could be additional transportation vehicles 150, which have no link to the eNB or base station transceiver 300, but have a link to other relay stations 150, multiple relay stations 150, respectively. One such transportation vehicle/relay station 150 is shown in dotted lines at the bottom left of FIG. 1.

The mobile communication system 400 may, for example, correspond to one of the Third Generation Partnership Project (3GPP)-standardized mobile communication networks, where the term mobile communication system 400 is used synonymously to mobile communication network. The mobile or wireless communication system 400 may correspond to a mobile communication system of the 5th Generation (5G) and may use mm-Wave technology. The mobile communication system 400 may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver 300 can be operable or configured to communicate with one or more active mobile transceivers 100, 150, 200 and a base station transceiver 300 can be located in or adjacent to a coverage area of another base station transceiver, e.g., a macro cell base station transceiver or small cell base station transceiver. Hence, disclosed embodiments may provide a mobile communication system 400 comprising one or more mobile transceivers 100, 150, 200 and one or more base station transceivers 300, wherein the base station transceivers 300 may establish macro cells or small cells, as, e.g., pico-, metro-, or femto cells. A mobile transceiver 100, 150, 200 may correspond to a smartphone, a cell phone, user equipment, a laptop, a notebook, a personal computer, a Personal Digital Assistant (PDA), a Universal Serial Bus (USB)-stick, a car, a transportation vehicle etc. A mobile transceiver 100, 150, 200 may also be referred to as User Equipment (UE) or mobile in line with the 3GPP terminology.

A base station transceiver 300 can be located in the fixed or stationary part of the network or system. A base station transceiver 300 may correspond to a remote radio head, a transmission point, an access point, a macro cell, a small cell, a micro cell, a femto cell, a metro cell etc. A base station transceiver 300 can be a wireless interface of a wired network, which enables transmission of radio signals to a UE or mobile transceiver 100, 150, 200. Such a radio signal may comply with radio signals as, for example, standardized by 3GPP or, generally, in line with one or more of the above listed systems. Thus, a base station transceiver 300 may correspond to a NodeB, an eNodeB, a Base Transceiver Station (BTS), an access point, a remote radio head, a relay station, a transmission point etc., which may be further subdivided in a remote unit and a central unit.

A mobile transceiver 100, 150, 200 can be associated with a base station transceiver 300 or cell. The term cell refers to a coverage area of radio services provided by a base station transceiver, e.g., a NodeB (NB), an eNodeB (eNB), a remote radio head, a transmission point, etc. A base station transceiver 300 may operate one or more cells on one or more frequency layers, in some disclosed embodiments a cell may correspond to a sector. For example, sectors can be achieved using sector antennas, which provide a characteristic for covering an angular section around a remote unit or base station transceiver 300. In some disclosed embodiments, a base station transceiver 300 may, for example, operate three or six cells covering sectors of 120° (in case of three cells), 60° (in case of six cells) respectively. A base station transceiver 300 may operate multiple sectorized antennas. In the following a cell may represent an according base station transceiver 300 generating the cell or, likewise, a base station transceiver 300 may represent a cell the base station transceiver 300 generates.

In other words, in disclosed embodiments, the mobile communication system 400 may correspond to a Heterogeneous Network (HetNet), which utilizes different cell types, i.e., Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers 300 for which their coverage areas are determined by their transmission power and interference condition. In some disclosed embodiments a small cell's coverage area can at least partly be surrounded by the coverage area of a macro cell established by another base station transceiver. The small cells can be deployed to extend the capacity of the network. A metro cell may therefore be used to cover a smaller area than a macro cell, e.g., a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household, the inside of a transportation vehicle or a gate section at the airport, i.e., its coverage area may have a diameter below 50 m. Thus, a base station transceiver 300 may also be referred to as cell.

Mobile transceivers 100,150, 200 may communicate directly with each other, i.e., without involving any base station transceiver 300, which is also referred to as Device-to-Device (D2D) communication. An example of D2D is direct communication between transportation vehicles, also referred to as Vehicle-to-Vehicle communication (V2V). To do so, radio resources are used, e.g., frequency, time, code, and/or spatial resources, which may as well be used for wireless communication with a base station transceiver 300. The assignment of the radio resources may be controlled by the base station transceiver 300, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4).

As shown in FIG. 1 the apparatus 10 for estimating a multi-hop radio channel between the transmitter 100, the one or more relay stations 150, and the receiver 200 in the mobile communication system 400 comprises one or more interfaces 12. In general, at least one of the transmitter 100, the receiver 200, and the one or more relay stations 150 may correspond to a vehicular entity, and the control module 14 may be configured to provide the information related to the configuration of the multi-hop radio channel to the at least one vehicular entity.

In disclosed embodiments the one or more interfaces 12 of the apparatus 10 may be a connector, a pin, a plug, a register, etc. that is configured to provide and/or to determine signals from other network components. In some disclosed embodiments the one or more interfaces 12 may be configured to provide and/or determine analog or digital signals to enable the exchange of the information as detailed in the sequel. Between the one or more interfaces 12 and other components there may be intermediate links, wired or wireless connections, interfaces, etc. The one or more interfaces 12 are configured or adapted such that corresponding information or signaling can be exchanged between the apparatus 10 and the respective other network components, e.g., the base station transceiver 300.

In disclosed embodiments the one or more interfaces 12 are configured to obtain information related to a position and a state of movement of the transmitter 100 and receiver 200, information related to an environment of the transmitter 100, the receiver 200, and the one or more relay stations 150, information related to channel state feedback of single-hop radio channels between the transmitter 100, the receiver 200, and the one or more relay stations 150, and information related to delays of the channel state feedback. Information related to a quantity or scenario may be transferred using analog or digital signals, e.g., one or a number of binary values (bits) may be used to represent such information.

As further shown in FIG. 1 the one or more interfaces 12 are coupled to a control module 14. In disclosed embodiments the control module 14 may be implemented using one or more processing units, one or more processing devices, any method for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

In the disclosed embodiment depicted in FIG. 1 the control module 14 is configured to control the one or more interfaces 12, wherein the control module 14 is further configured to determine information related to a channel state and a configuration of the multi-hop radio channel based on the information related to the position and the state of movement of the transmitter 100 and receiver 200, the information related to the environment of the transmitter 100, the receiver 200, and the one or more relay stations 150, the information related to the channel state feedback of the single-hop radio channels between the transmitter 100, the one or more relay stations 150, and the transmitter 100, and the information related to delay of the channel state feedback.

For example, in disclosed embodiments the control module 14 may be configured to determine the information related to the configuration of the multi-hop radio channel by evaluating different combinations of the single-hop radio channels based on a weakest link per combination. The weakness of a link may be represented by any information related to a quality measure for a radio channel, such as a Signal-to-Noise-Ratio (SNR), a Signal-to-Interference-Ratio (SIR), a Signal-to-Noise-and-Interference-Ratio (SINR), a Bit-Error-Ratio (BER), bit energy over noise density, etc. In some disclosed embodiments the control module 14 is configured to determine the information related to the channel state of the multi-hop radio channel by selecting the weakest single-hop radio channel of the multi-hop radio channel to be above a threshold. The weakest link may be optimized. The term optimized in this context is not to be understood as mandatorily being the theoretical maximum (although it could be) but rather in the sense of selecting the weakest link such that a performance on the link is satisfactory under the circumstances. The weakest link may determine the overall quality of the multi-hop radio channel.

In disclosed embodiments the transmitter 100, the one or more relay stations 150, and the receiver 200 may be sensor-equipped transportation vehicles capable to fuse available sensor data, process it and conduct feature extraction. This information can be transferred to the communication system 400, which will learn about the transportation vehicle's position, dynamics, and presence of objects with distinct properties and will enable estimation of expected future environmental states. Since the exchange of local information about the environment is an inherent property of V2V communications, it can be assumed that each transportation vehicle is capable to obtain dynamic and static properties of the surrounding environment including other transportation vehicles with the precision of the available off-the-shelf sensor equipment. Disclosed embodiments may then conduct sensor-based prediction for the multi-hop scenario.

Figure 2:
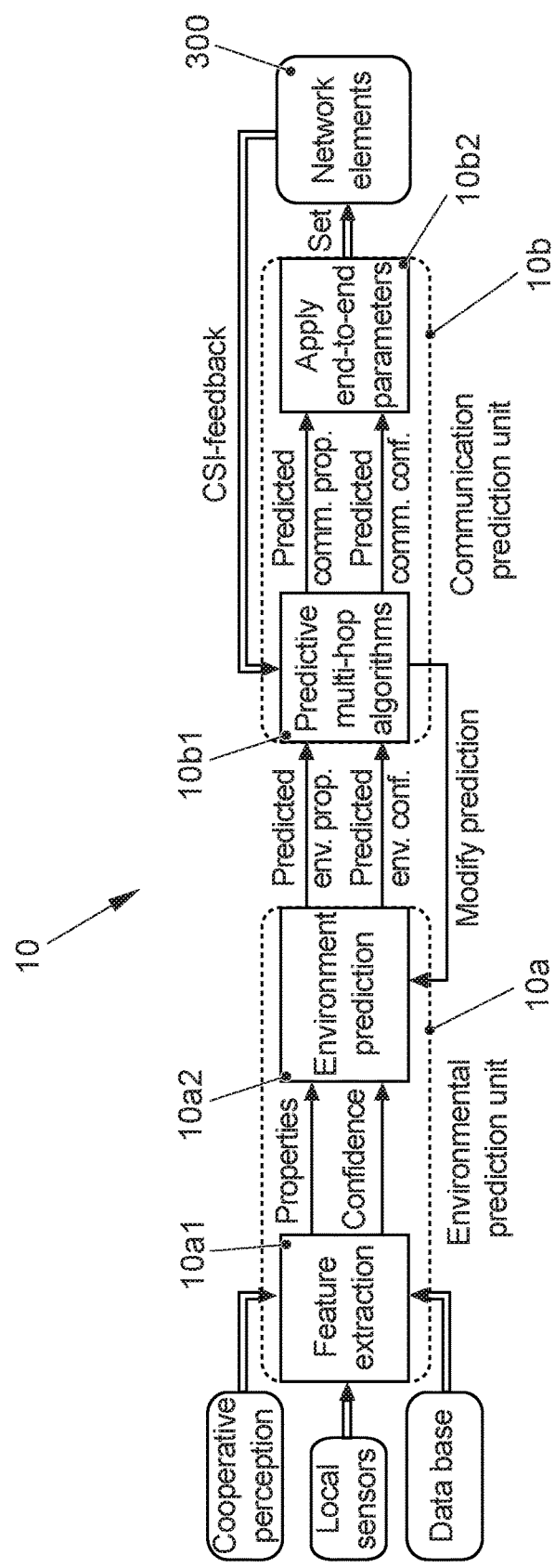
FIG. 2 illustrates a block-scheme of multi-hop vehicular predictive communication in an embodiment.

FIG. 2 illustrates a block-scheme of multi-hop vehicular predictive communication in a disclosed embodiment. FIG. 2 shows an embodiment of the apparatus 10. On the left hand side there is an environmental prediction unit 10a, which obtains information from cooperative perception, local sensors and a data base. From this information a feature extraction unit 10a1 may extract environmental property information and confidence information and provide the outcome to an environment prediction module 10a2. Predicted environment properties and predicted confidence information may then be provided to a communication prediction unit 10b. The communication prediction unit 10b comprises a predictive multi-hop algorithm unit 10b1 and an application unit 10b2 for end-to-end parameters. The predictive multi-hop algorithm unit 10b1 is provided with the predicted environment property information and the predicted confidence information and predicts communication property and confidence information based thereon. The application unit 10b2 for end-to-end parameters then provides a set of parameters to according network elements, e.g., a base station transceiver 300. Channel state information can be provided from the network element 300 to the predictive multi-hop algorithm unit 10b1. Based on this actual channel state information modification information may be provided to the environment prediction module 10a2 of the environment prediction unit 10a.

For example, if a V2V network with M transportation vehicles is involved in multi-hop communication tasks, it can be assumed that the information about the environment is periodically exchanged among the transportation vehicles.

Finally, at the time instant t the following processed information will be available at the decision making node or apparatus 10:
information related to a position and a state of movement of the transmitter 100 and receiver 200, e.g., in terms of vectors of M two-dimensional estimated positions
$\hat{p}_{vh}$
and estimated directions combined with absolute velocities of each transportation vehicle
$\hat{v}_{dv}$,
information related to an environment of the transmitter 100, the receiver 200, and the one or more relay stations 150, e.g., in terms of a matrix of estimated positions
$\hat{P}_{\hat{O}}$
and estimated dimensions
$\hat{D}_{\hat{O}}$
of
$\hat{O}$
detected objects,
information related to channel state feedback of single-hop radio channels between the transmitter 100, the receiver 200, and the one or more relay stations 150, e.g., in terms of a vector of delayed CSI-feedbacks
$f_{CSI}(\gamma)$
from L scheduled links between M nodes,
information related to delays of the channel state feedback, e.g., in terms of vectors of corresponding feedback delays
$d_L$
and
$d_{nr,data}(N)$,
at least in some disclosed embodiments the information related to channel state feedback of the single-hop radio channels between the transmitter 100, the receiver 200, and the one or more relay stations 150 may comprise information related to confidence intervals of the feedback information, e.g., in terms of a vector of confidence intervals for received feedback parameters, which depend on properties of detected objects.

The optimal efficiency at time t of the end-to-end transmission as the highest spectral efficiency can be defined as
$R_{j,B}$
of the weakest link B out of all possible links and paths between transmitter A and receiver D. The control module 14 may be configured to determine the information related to the channel state and the configuration of the multi-hop radio channel by selecting a combination of single-hop radio channels with a highest spectral efficiency of the weakest link comprised in the combination as configuration for the multi-hop radio channel.

Figure 3:
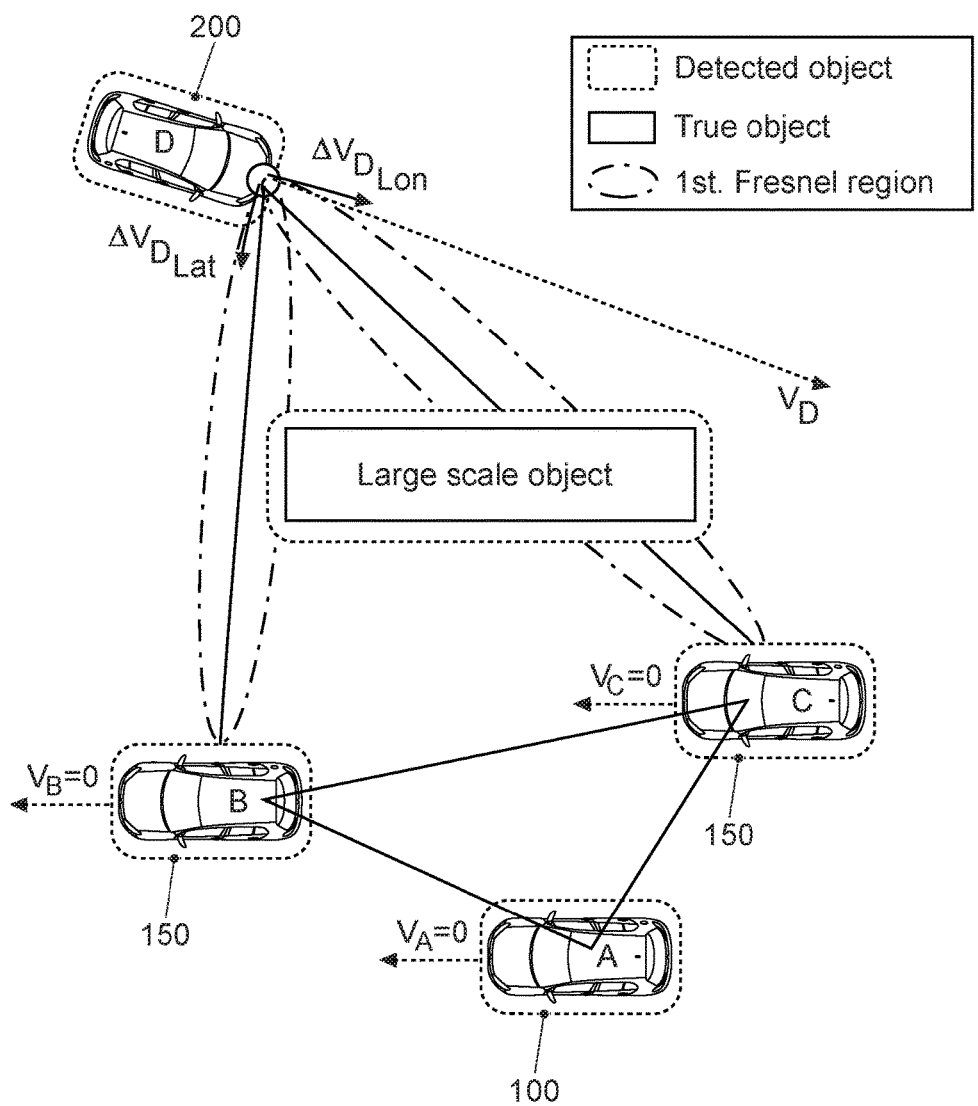
FIG. 3 shows a scenario of V2V communication in an embodiment.

FIG. 3 shows a scenario of V2V communication in a disclosed embodiment. FIG. 3 illustrates three transportation vehicles A, B, C, D in which transportation vehicle A may correspond to the transmitter 100, and transportation vehicle D may correspond to the receiver 200, transportation vehicles B and C may correspond to the one or more relay stations 150. The velocities of the transportation vehicles are given by vA=0, vB=0, vC=0 and vD>0 (components thereof are also indicated in FIG. 3). FIG. 3 further indicates that a large scale object is detected in the environment, where FIG. 3 shows a detected silhouette of the object and the silhouette of the actual object. The information related to the environment of the transmitter 100, the receiver 200, and the one or more relay stations 150 may comprise information related to estimated positions and dimensions of objects detected in the environment. The communication links are indicated by solid lines and the first Fresnel zone using a broken line.

In a disclosed embodiment the control module 14 is configured to predict a future channel state of the single-hop channels based on the information related to the position and state of movement of the transmitter 100 and the receiver 200 and based on the information related to the environment of the transmitter 100, the receiver 200, and the one or more relay stations 150. The control module 14 is further configured to predict a future channel state of the multi-hop radio channel based on the information related to the position and state of movement of the transmitter 100 and the receiver 200 and based on the information related to the environment of the transmitter 100 the receiver 200 and the one or more relay stations 150.

An actually selected spectral efficiency for each link may deviate from the optimum due to the feedback delay and the dynamics of link quality variation. Then, if the end-to-end path was optimally selected, the non-predictive approach results in the feedback-dependent and network-dynamics-dependent SINR mismatch:

$$q_{AN}(B)=\alpha_\gamma(B)d_{nr,data}(B),$$

where
$\alpha_\gamma(B)$
is the dynamics of SINR deviation at the link B, and
$d_{nr,data}(B)$
is the total feedback delay for the link B.

Then, for the predictive communication approach the following algorithm is applied at the decision making node or apparatus 10 in a disclosed embodiment:
1) based on available information about environment, such as
$\hat{p}_{vh}, \hat{v}_{dv}, \hat{P}_O, \hat{D}_O,$
and received delayed CSI feedbacks from each link of interest, predict the expected CSI-states and confidence intervals for every link b out of L at the time of potential link use,
2) find the optimal end-to-end path from A to D given the predicted CSI-states and confidence intervals,
3) start transmission and, if applicable, adjust feedback periodicity requests
$d_{pFB,pred}(b)=d_{pFB}\cdot d_{\alpha(b)}$
according to prediction deviation scalar
$d_{\alpha(b)}$
dependent on
$\alpha(b)$.
4) adjust confidence intervals based on the new feedback. Now the predictive SINR mismatch for the weakest link B will depend on the prediction deviation
$\alpha(B)$
per unit of time and the time
$d_{pred}(B)$
to reach the link B, which differs from
$d_{nr,data}(B)$
by variable feedback periodicity
$d_{pFB,pred}(B)$
instead of
$d_{pFB}(B)$:
$q_{pred}(B)=\alpha(B)d_{pred}(B)$ As can be seen from the above discussion, the quality of multi-hop predictive communication approach depends on the vehicular sensors predictive precision parameter
$\alpha(b)$
and, if periodic updates used, also by a periodicity coefficient
$d_{\alpha(b)}$,
which can be also dynamically reconfigured if the knowledge about environment is provided by vehicular sensors. Hence, at least in some disclosed embodiments the control module 14 is configured to provide information related to an adapted reporting rate for a single-hop channel, the information related to the adapted reporting rate being based on a predicted coherence time of the single-hop channel. The control module can be configured to compare a predicted channel quality with an actual channel quality of the multi-hop radio channel and to adjust a feedback reporting rate for the information related to a single-hop radio the channel based on a deviation between the predicted and the actual channel quality.

Disclosed embodiments may realize a range of predictive algorithms at the communication node which schedules multi-hop transmission. To mention a few, it may allow
 minimizing or a reduction of the multi-hop CSI-aging impact,
 minimizing or a reduction of a required number of feedback messages over the network, and
 selection of more (theoretically even the most) efficient or stable end-to-end paths among multiple possible options, etc.

Figure 4:
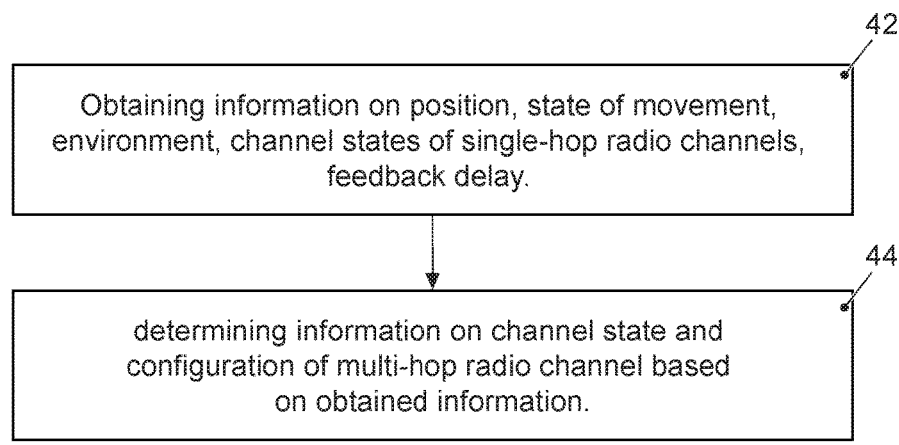
FIG. 4 shows a block diagram of a flow chart of an embodiment of a method for estimating a multi-hop radio channel between a transmitter, one or more relay stations, and a receiver in a mobile communication system.

FIG. 4 shows a block diagram of a flow chart of a disclosed embodiment of a method for estimating a multi-hop radio channel between a transmitter 100, one or more relay stations 150, and a receiver 200 in a mobile communication system 400. The method comprises obtaining 42 information related to a position and a state of movement of the transmitter 100 and receiver 200, information related to an environment of the transmitter 100, the receiver 200, and the one or more relay stations 150, information related to channel state feedback of single-hop radio channels between the transmitter 100, the receiver 200, and the one or more relay stations 150, and information related to delays of the channel state feedback. The method further comprises determining 44 information related to a channel state and a configuration of the multi-hop radio channel based on the information related to the position and the state of movement of the transmitter 100 and receiver 200, the information related to the environment of the transmitter 100, the receiver 200, and the one or more relay stations 150, the information related to the channel state feedback of the single-hop radio channels between the transmitter 100, the one or more relay stations 150, and the transmitter 100, and the information related to delay of the channel state feedback.

Another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventors to furthering the art, and are to be construed as being without limitation to such specifically recited examples and conditions. Moreover, all statements herein reciting principles, properties, and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having mechanisms for performing each of the respective operations of these methods.

LIST OF REFERENCE SIGNS 10 apparatus for estimating
10a environmental prediction unit
10a1 feature extraction unit
10a environmental prediction module
10b communication prediction unit
10b1 predictive multi-hop algorithms
10b2 application end-to-end parameters
12 one or more interfaces
14 control module
42 obtaining information
44 determining information
100 Transmitter
150 one or more relay stations
200 receiver
300 base station transceiver
400 mobile communication system

The invention claimed is:

1. An apparatus for estimating a multi-hop radio channel between a transmitter, one or more relay stations, and a receiver in a mobile communication system, the apparatus comprising:
   one or more interfaces to obtain information related to a position and a state of movement of the transmitter and receiver, information related to an environment of the transmitter, the receiver, and the one or more relay stations, information related to channel state feedback of single-hop radio channels between the transmitter, the receiver, and the one or more relay stations, and information related to delays of the channel state feedback; and
   a control module to control the one or more interfaces, wherein the control module determines information related to a channel state and a configuration of the multi-hop radio channel based on the information related to the position and the state of movement of the transmitter and receiver, the information related to the environment of the transmitter, the receiver, and the one or more relay stations, the information related to the channel state feedback of the single-hop radio channels between the transmitter, the one or more relay stations, and the receiver, and the information related to delay of the channel state feedback,
   wherein the information related to the environment of the transmitter, the receiver, and the one or more relay stations comprises information related to estimated positions and dimensions of objects detected in the environment.

2. The apparatus of claim 1, wherein the control module determines the information related to the configuration of the multi-hop radio channel by evaluating different combinations of the single-hop radio channels based on a weakest link per combination.

3. The apparatus of claim 2, wherein the control module determines the information related to the channel state of the multi-hop radio channel by selecting the weakest single-hop radio channel of the multi-hop radio channel to be above a threshold.

4. The apparatus of claim 2, wherein the control module determines the information related to the channel state and the configuration of the multi-hop radio channel by selecting a combination of single-hop radio channels with a highest spectral efficiency of the weakest link comprised in the combination as configuration for the multi-hop radio channel.

5. The apparatus of claim 1, wherein the control module predicts a future channel state of the single-hop channels based on the information related to the position and state of movement of the transmitter and the receiver and based on the information related to the environment of the transmitter, the receiver, and the one or more relay stations.

6. The apparatus of claim 1, wherein the control module predicts a future channel state of the multi-hop radio channel based on the information related to the position and state of movement of the transmitter and the receiver and based on the information related to the environment of the transmitter, the receiver, and the one or more relay stations.

7. The apparatus of claim 1, wherein the control module provides information related to an adapted reporting rate for a single-hop channel, the information related to the adapted reporting rate being based on a predicted coherence time of the single-hop channel.

8. The apparatus of claim 1, wherein at least one of the transmitter, the receiver, and the one or more relay stations corresponds to a vehicular entity, and wherein the control module provides the information related to the configuration of the multi-hop radio channel to the at least one vehicular entity.

9. The apparatus of claim 1, wherein the information related to channel state feedback of the single-hop radio channels between the transmitter, the receiver, and the one or more relay stations comprises information related to confidence intervals of the feedback information.

10. The apparatus of claim 1, wherein the control module compares a predicted channel quality with an actual channel quality of the multi-hop radio channel and adjusts a feedback reporting rate for the information related to a single-hop radio channel based on a deviation between the predicted and the actual channel quality.

11. A base station transceiver of a mobile communication system, the base station transceiver comprising the apparatus of claim 1.

12. A method for estimating a multi-hop radio channel between a transmitter, one or more relay stations, and a receiver in a mobile communication system, the method comprising:
   obtaining:
      information related to a position and a state of movement of the transmitter and receiver,
      information related to an environment of the transmitter, the receiver, and the one or more relay stations,
      information related to channel state feedback of single-hop radio channels between the transmitter, the receiver, and the one or more relay stations, and
      information related to delays of the channel state feedback; and
   determining information related to a channel state and a configuration of the multi-hop radio channel based on:
      the information related to the position and the state of movement of the transmitter and receiver,
      the information related to the environment of the transmitter, the receiver, and the one or more relay stations,
      the information related to the channel state feedback of the single-hop radio channels between the transmitter, the one or more relay stations, and the receiver, and
      the information related to delay of the channel state feedback,
   wherein the information related to the environment of the transmitter, the receiver, and the one or more relay stations comprises information related to estimated positions and dimensions of objects detected in the environment.

13. A non-transitory computer readable medium containing a computer program having a program code for performing a method for estimating a multi-hop radio channel between a transmitter, one or more relay stations, and a receiver in a mobile communication system when the computer program is executed on a computer, a processor, or a programmable hardware component, the method comprising:
   obtaining:
      information related to a position and a state of movement of the transmitter and receiver,
      information related to an environment of the transmitter, the receiver, and the one or more relay stations,
      information related to channel state feedback of single-hop radio channels between the transmitter, the receiver, and the one or more relay stations, and
      information related to delays of the channel state feedback; and
   determining information related to a channel state and a configuration of the multi-hop radio channel based on:
      the information related to the position and the state of movement of the transmitter and receiver,
      the information related to the environment of the transmitter, the receiver, and the one or more relay stations,
      the information related to the channel state feedback of the single-hop radio channels between the transmitter, the one or more relay stations, and the receiver, and
      the information related to delay of the channel state feedback,
   wherein the information related to the environment of the transmitter, the receiver, and the one or more relay stations comprises information related to estimated positions and dimensions of objects detected in the environment.

* * * * *